S. B. CLARDY.
DRUM HARROW.
APPLICATION FILED FEB. 4, 1909.
942,376.
Patented Dec. 7, 1909.
2 SHEETS—SHEET 1.
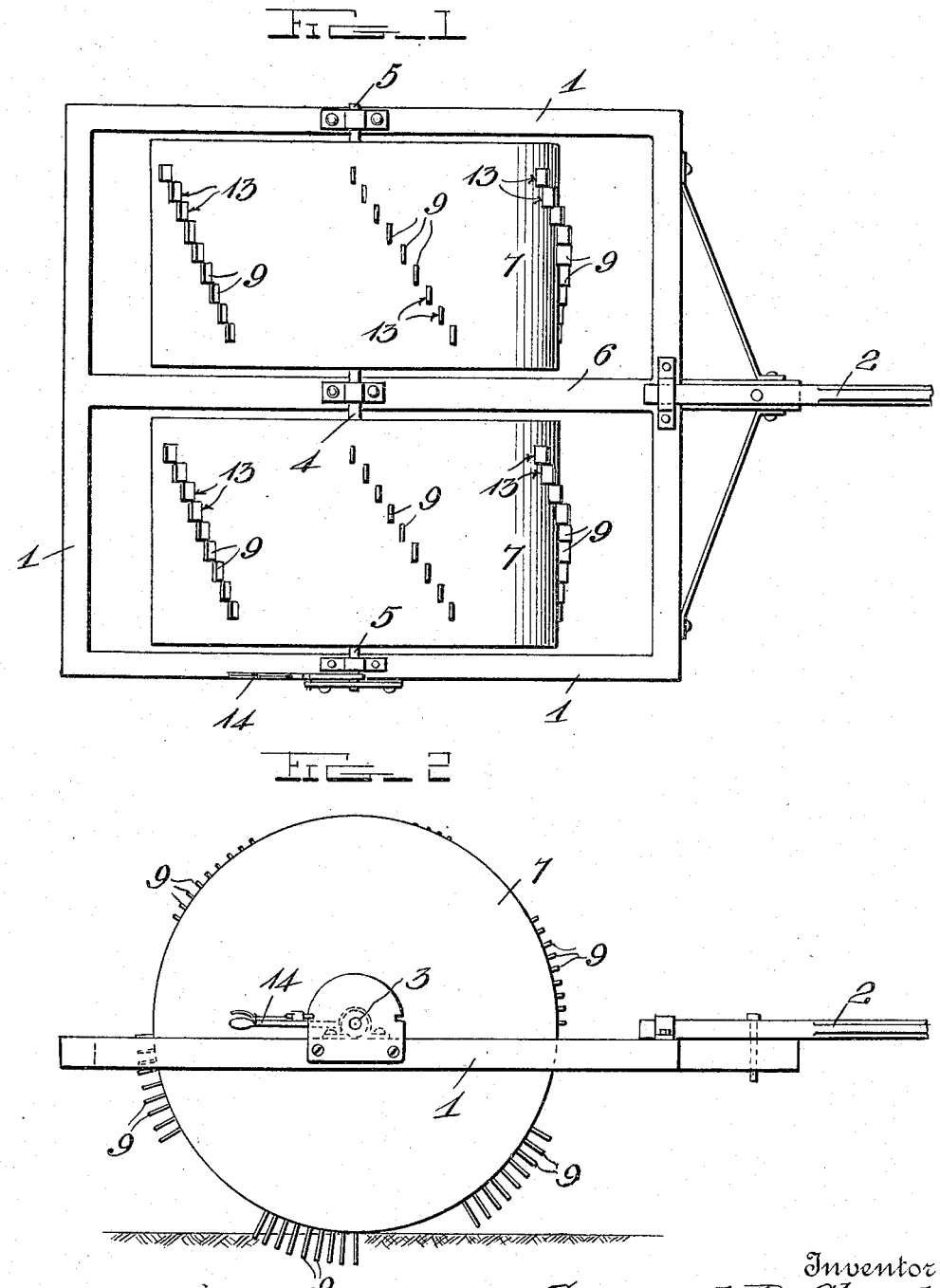
Witnesses
C. Clemmer
C. H. Griesbauer
Inventor
Samuel B. Clardy
By H. B. Willson & Co.
Attorneys

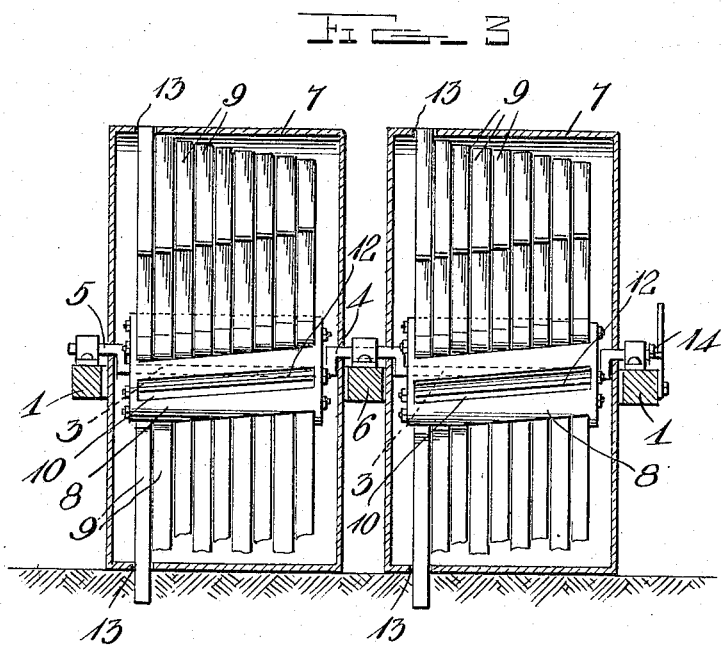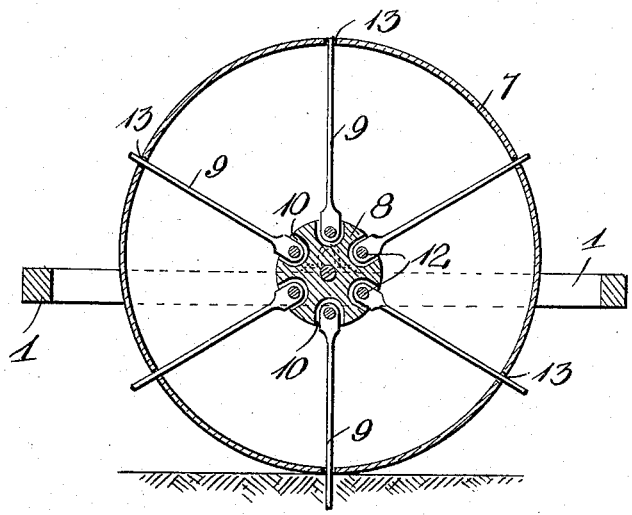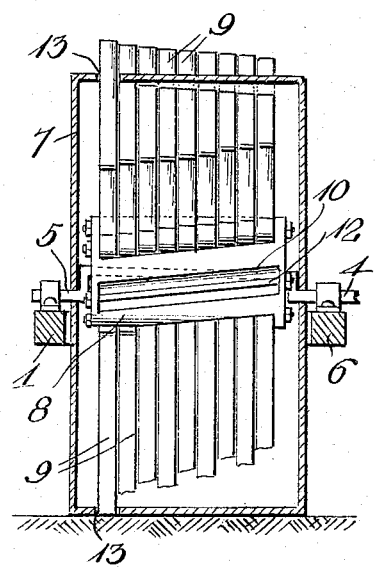

UNITED STATES PATENT OFFICE.

SAMUEL B. CLARDY, OF ACKERMAN, MISSISSIPPI.

DRUM HARROW.

942,376.   Specification of Letters Patent.   Patented Dec. 7, 1909.

Application filed February 4, 1909. Serial No. 475,990.

*To all whom it may concern:*

Be it known that I, SAMUEL B. CLARDY, a citizen of the United States, residing at Ackerman, in the county of Choctaw and State of Mississippi, have invented certain new and useful Improvements in Drum Harrows; and I do declare the following to be a full, clear, and exact description of the invention, such as will enable others skilled in the art to which it appertains to make and use the same.

This invention relates to improvements in drum harrows.

The object of the invention is to provide a harrow of this character having means whereby the teeth will be projected from the drum of the harrow at the proper time for engaging the soil, and after having been engaged with the latter will be retracted into the drum whereby any rubbish or accumulation adhering to the teeth will be removed.

A further object is to provide means whereby the teeth operating parts of the machine may be reversed to cause the teeth to be retracted at the lower side of the drum and thus permit the harrow to be readily moved from place to place without danger of injury to the teeth.

With these and other objects in view, the invention consists of certain novel features of construction, combination and arrangement of parts as will be described and particularly pointed out in the appended claims.

In the accompanying drawings, Figure 1 is a plan view of a harrow constructed in accordance with the invention; Fig. 2 is a side view of the same; Fig. 3 is a cross sectional view taken on the line with the operating shaft or axle; Fig. 4 is a vertical longitudinal sectional view taken through one of the cylinders or drums of the harrow; Fig. 5 is a view similar to Fig. 3, showing the axle reversed to project the teeth through the upper side of the drum and thus permit the harrow to be moved from place to place without injury to the teeth.

Referring more particularly to the drawings, 1 denotes the supporting frame, which may be of any suitable construction, but which is here shown in the form of an open rectangular frame of sufficient size to accommodate two sets of harrow mechanism. To the frame 1 is connected a draft tongue 2. Mounted in the side bars of the frame is a combined supporting axle and operating shaft, 3, provided at its center with a crank portion, 4, and at each end with cranks, 5. The end cranks, 5, of the axle are engaged with suitable bearings on the side bars of the frame, while the center crank, 4, is mounted in suitable bearings on a central bar, 6, of the frame. On the cranked portions of the shafts and arranged in each side of the frame, are hollow metallic drums or cylinders, 7, which are adapted to revolve on the cranked portions of the shaft. On the portions of the shaft between the cranked ends and center thereof, are revolubly mounted hubs, 8, on each of which is loosely mounted a series of harrow teeth, 9. The teeth 9 are arranged on the hubs in oblique rows and extend from one end of the hub to the other. The hubs, 8, are provided with obliquely disposed grooves 10, which extend from one end to the other of the hubs and provide seats with which the inner ends of the teeth, 9, are engaged. The inner ends of the teeth are loosely held in the grooves, 10, preferably by means of transversely disposed bolts, 12, which pass through the end of each tooth and are secured at their opposite ends in the hubs in any suitable manner. By thus connecting the teeth, 9, a certain amount of motion or freedom of movement is permitted.

There may be any desired number of rows of teeth, and any number of teeth in each row, but in practice I prefer to employ nine rows of six teeth for each of the hubs, 8. The outer ends of the teeth are slidably engaged with apertures, 13, formed in the sides of the drum, whereby when the latter and the hubs, 8, revolve on the shafts or axle, said teeth are projected from and retracted into the drums.

In the operation of the device, assuming the parts to be in the position shown in Figs. 1 to 4 of the drawings, wherein the hub-carrying portions of the axle project below the cranked portions thereof, the drums will revolve on the cranked portion of the axle as the machine is drawn along, thereby turning the toothed hubs on the axle, so that, by reason of the fact that the drums are mounted on one center and the hubs on another center, and thus are eccentric to the center of the drums, the teeth carried by the hub will be projected through the apertures in the drums and retracted into the same as the drums and hubs revolve together on the axle. The arrangement of the cranked axle as shown in the first figures of the drawings is such that the rows of teeth on the hubs as they reach the under side of the axle will be projected beyond the lower side of the drum to their greatest extent, the rows being gradually retracted on the rear side of the drum and projected on the forward side as the drums and hubs revolve in the manner described.

With the parts arranged to operate as above described, the harrow is ready for use for pulverizing the soil, the successive rows of teeth being projected into the soil as the machine is drawn along. As the teeth leave the soil and are retracted into the drum, any soil or rubbish adhering thereto will be scraped off.

In order that the drums may be moved over hard or rough ground as when being taken from one field to another, the position of the axle is reversed, that is to say, the hub-carrying portions are swung around in the drums to project upwardly above the cranked portion of the axle so that as the machine is drawn along and the drums and hubs thereby revolve on the axle, the teeth will be projected beyond the upper portions on the drums instead of through the lower portions thereof, as when the axle is in the position shown in the first figures of the drawing.

In order to turn the axle to the position shown in Fig. 5, I provide on one end of the axle a right-angularly projecting lever, 14, which is adapted to be engaged with a suitable holding mechanism whereby when swung in one position or the other to shift the axle, the same may be secured and the axle thereby rigidly held in operative position.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A harrow comprising a hollow drum provided with openings and adapted to rotate, a hub adapted to rotate within the drum on an axis eccentric thereto, and bars loosely mounted on the hub and adapted to project through the openings in the drum.

2. A harrow comprising a shaft the spindles of which are eccentrically placed with reference to the main body thereof, a hollow drum journaled on the spindles and having openings in its shell, a hub adapted to rotate on the main body of the shaft, and bars loosely connected to the hub and adapted to project through the openings in the shell of the drum.

3. A harrow comprising a frame, bearings carried thereby, a shaft, the spindles of which are arranged eccentrically with relation to its main body and are journaled in said bearings, a hollow drum journaled on the spindles and having openings in its shell, a hub journaled on the main body of the shaft, and bars loosely connected to the hub and adapted to project through the openings in the shell of the drum.

4. A harrow comprising a frame, bearings carried thereby, a shaft, the spindles of which are arranged eccentrically with relation to its main body and are journaled in said bearings, means for adjusting the main body of the shaft with reference to the spindles to bring it above or below them, a hollow drum journaled on the spindles and having openings in its shell, a hub journaled on the main body of the shaft, and bars loosely connected to the hub and adapted to project through the openings in the shell of the drum.

5. A harrow comprising a frame, bearings carried thereby, a shaft, the spindles of which are arranged eccentrically with relation to its main body and are journaled in said bearings, means for adjusting the main body of the shaft with reference to the spindles to bring it above or below them, means for locking it in its adjusted positions, a hollow drum journaled on the spindles and having openings in its shell, a hub journaled on the main body of the shaft, and bars loosely connected to the hub and adapted to project through the openings in the shell of the drum.

6. A harrow comprising a shaft, the spindles of which are eccentrically placed with reference to the main body thereof, a hollow drum journaled on the spindles and having openings in its shell, a hub adapted to rotate on the main body of the shaft, provided with sockets in its periphery, and bars loosely pivoted in said sockets and adapted to project through the openings in the shell of the drum.

7. In a device of the character described, a supporting frame, a shaft journaled in said frame, said shaft having cranked portions, a drum revolubly mounted on said crank portions, a hub loosely mounted on said axle between said crank portions, rows of teeth loosely connected at their inner ends to said hub, and adapted to be projected and retracted thereby into and out of said drums.

8. In a harrow of the character described, a supporting frame, a cranked axle mounted in said frame, a drum revolubly mounted on said axle, a hub also mounted on said axle eccentrically to said drum, a series of harrow teeth arranged in oblique rows around said drums and loosely secured thereto at their inner ends and adapted to be projected thereby through the side of the drum at the proper time to engage the soil as said hub and drum revolve and to be retracted into the drum when disengaged from the soil.

9. In a harrow of the character described, a supporting frame, a cranked axle in said frame, means to reverse the position of said axle, a drum revolubly mounted on the cranked portion of the axle, a hub revolubly mounted on the axle between said cranked portions, said hub having formed therein a series of longitudinally disposed grooves, and a series of harrow teeth loosely mounted at their inner ends in said grooves, and adapted to be projected through and retracted into said drum as the latter and said hub revolve on the axle.

10. In a harrow of the character described, a supporting frame, a cranked axle arranged in said frame, a drum revolubly mounted on the cranked portions of the axle, said drum having formed therein annular rows of obliquely arranged passages, a hub revolubly mounted on the axle between said cranked portions thereof, said hub having formed therein a series of obliquely arranged grooves, a series of harrow teeth loosely mounted in said grooves and having their outer ends engaged with the passages in said drum, and an operating lever mounted on said axle whereby the latter is turned to change the working position of the hub.

In testimony whereof I have hereunto set my hand in presence of two subscribing witnesses.

SAMUEL B. CLARDY.

Witnesses:
  S. R. HUGHSTON,
  W. A. ELLIS.